July 1, 1952
G. E. BERGGREN ET AL
2,601,699
APPARATUS FOR CONTINUOUSLY MAKING VULCANIZED ARTICLES
Filed May 22, 1947
3 Sheets-Sheet 1
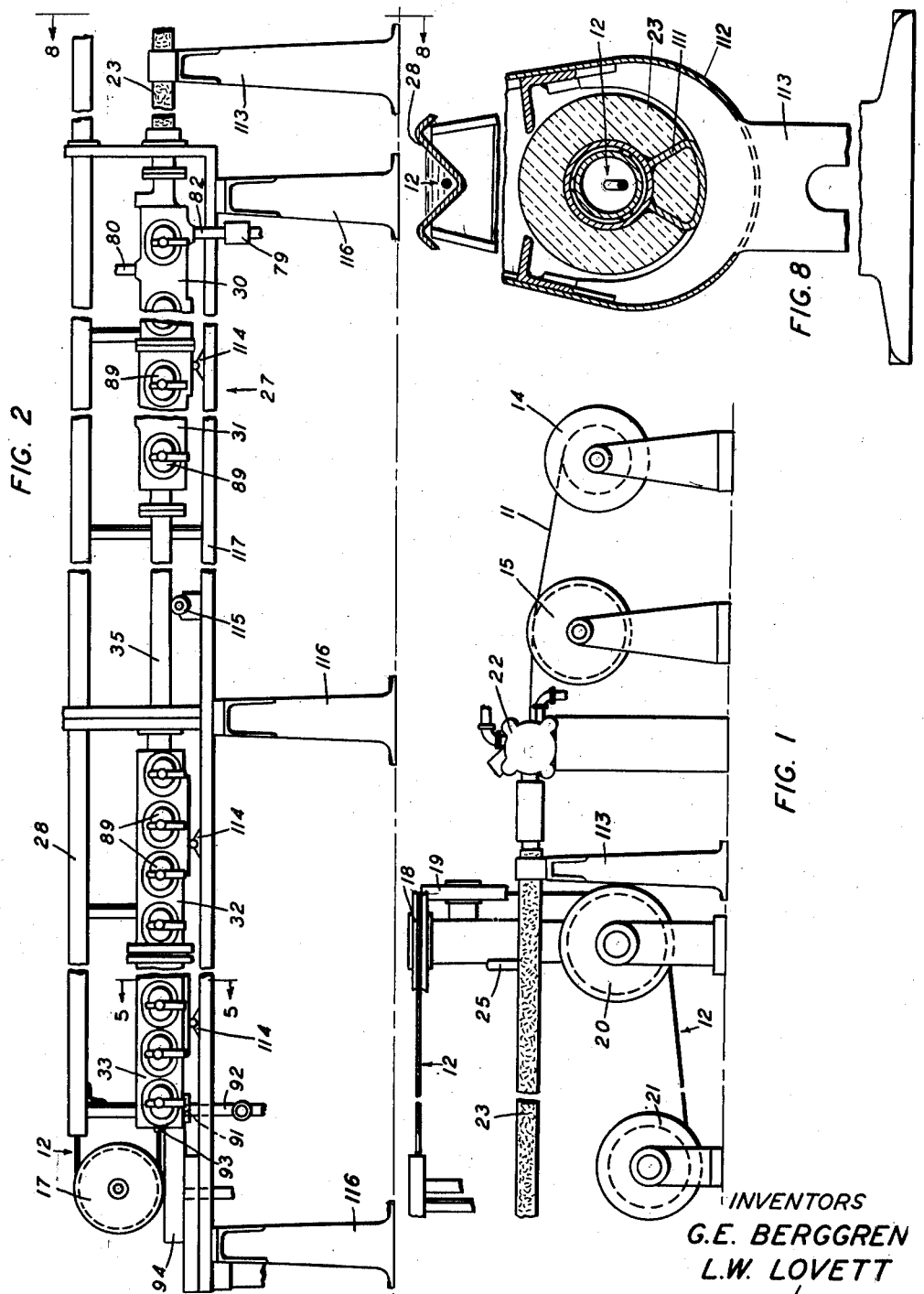
INVENTORS
G.E. BERGGREN
L.W. LOVETT
BY
ATTORNEY July 1, 1952  G. E. BERGGREN ET AL  2,601,699
APPARATUS FOR CONTINUOUSLY MAKING VULCANIZED ARTICLES
Filed May 22, 1947  3 Sheets-Sheet 2
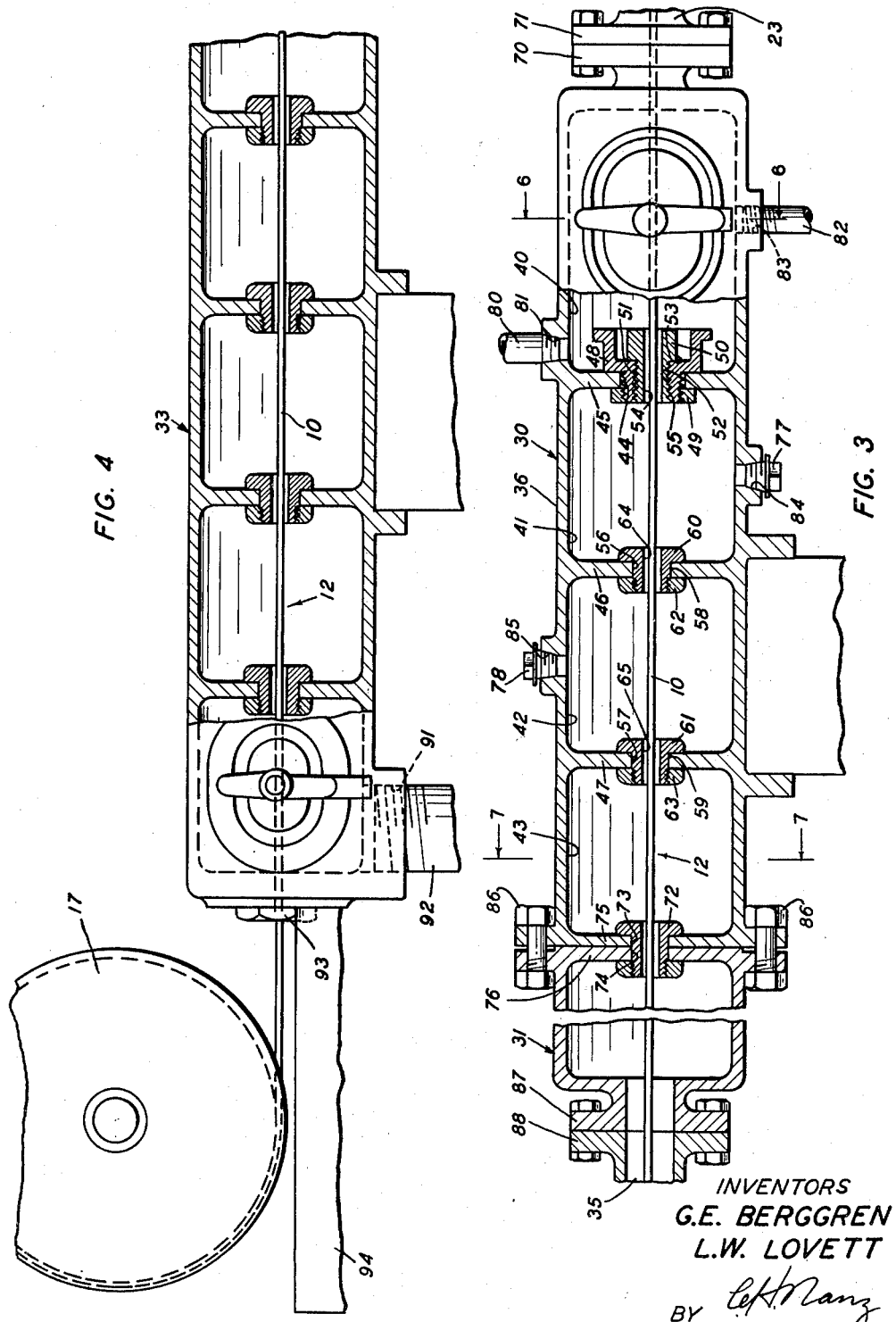
INVENTORS
G.E. BERGGREN
L.W. LOVETT
BY
ATTORNEY

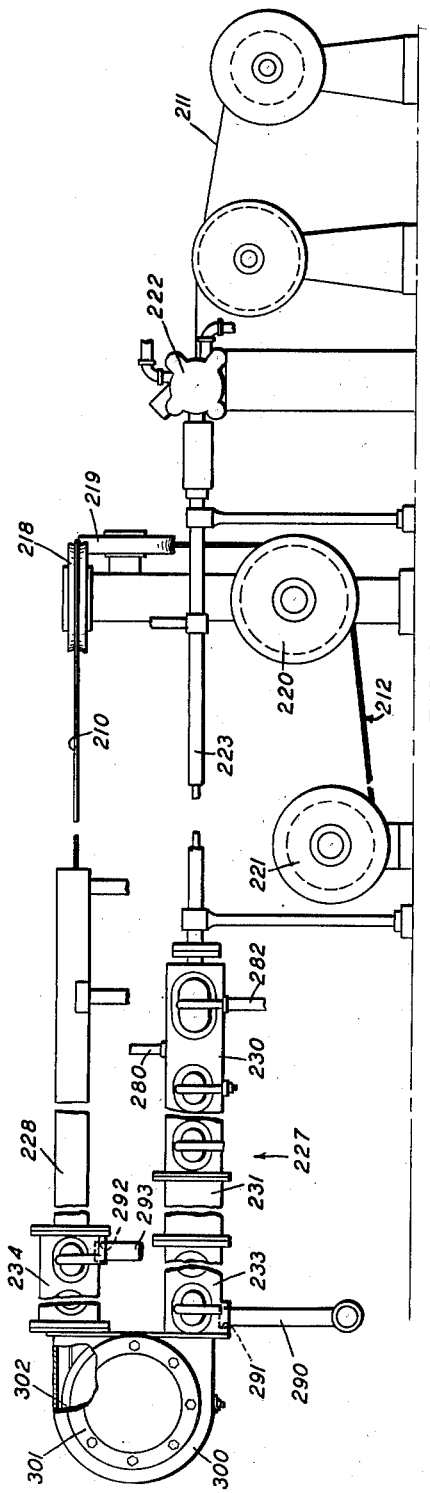
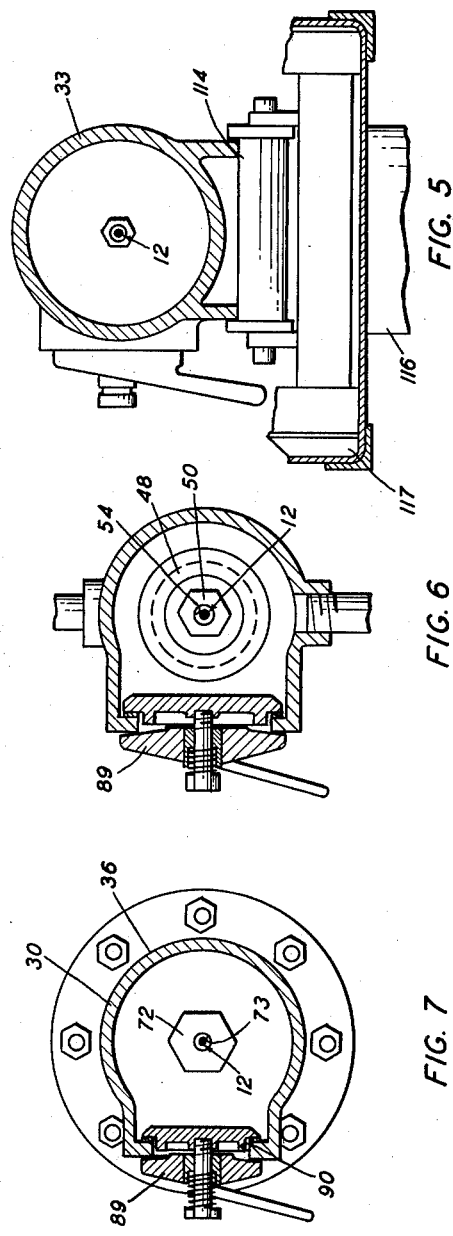

Patented July 1, 1952

2,601,699

UNITED STATES PATENT OFFICE 2,601,699

APPARATUS FOR CONTINUOUSLY MAKING VULCANIZED ARTICLES

George E. Berggren and Leroy W. Lovett, Baltimore, Md., assignors to Western Electric Company, Incorporated, New York, N. Y., a corporation of New York Application May 22, 1947, Serial No. 749,826

5 Claims. (Cl. 18—6)

This invention relates to apparatus for continuously making vulcanized articles, and more particularly to apparatus for cooling continuous lengths of vulcanized articles emerging from vulcanizing tubes having steam under a high pressure therein and for sealing the steam in the vulcanizing tubes from the atmosphere.

In the manufacture of articles having vulcanized coverings around filamentary cores including elements of hygroscopic material, such as textile materials, such cores are sometimes passed through an extruder which extrudes coverings of vulcanizable material thereover, and then are passed through a vulcanizing tube to vulcanize the coverings. Since such vulcanizing tubes have steam at a high temperature and under a high pressure therein, the heat of the steam may vaporize moisture in the hygroscopic elements of the cores. While the coverings are in the vulcanizing tube and are subjected to the high pressures of the steam, this moisture does not damage the coverings. However, if the moisture is not cooled sufficiently before the articles are withdrawn from the vulcanizing tubes into the atmosphere, the pressures of the moisture enclosed in the coverings of vulcanized material may expand and rupture the coverings or produce blisters therein.

In the past, rapidly flowing water under pressure has been passed through a cooling and sealing device connected in tandem with a vulcanizing tube and including a plurality of baffles positioned therein to greatly reduce the pressure of the cooling water as the water flows toward the exit of the cooling and sealing device. Thus, the water could be under a high pressure at the end of the device near the vulcanizing tube to seal steam in the tube, and under a much lower pressure at the end of which the article leaves the device and is subjected to atmospheric pressure. These baffles were provided with fixed openings which were large enough to permit articles of the largest size to pass therethrough without scraping the coverings thereof, and, hence, could not be adapted to efficiently reduce the pressure on the water when smaller articles were advanced through the apparatus.

An object of the invention is to provide new and improved apparatus for continuously making vulcanized articles.

Another object of the invention is to provide new and improved apparatus for cooling articles and for effectively sealing steam in vulcanizing tubes.

A further object of the invention is to provide new and improved apparatus for effectively reducing the pressure of cooling water in a cooling apparatus for a wide range of sizes of articles.

An apparatus illustrating certain features of the invention includes a plurality of aligned chambers having apertures in the walls separating the chambers, a plurality of bushings removably secured in the apertures in the walls of the chambers and openings in the chambers for permitting access to the interiors thereof.

A complete understanding of the invention may be obtained from the following detailed description of an apparatus forming specific embodiments thereof, when read in conjunction with the appended drawings, in which:

Fig. 1 is a fragmentary side elevation of a portion of an apparatus illustrating certain features of the invention;

Fig. 2 is a fragmentary side elevation of another portion of the apparatus shown in Fig. 1;

Fig. 3 is an enlarged, fragmentary, partially sectional view of a portion of the apparatus;

Fig. 4 is an enlarged, fragmentary, partially sectional view of a portion of the apparatus extending from the portion of the apparatus shown in Fig. 3;

Fig. 5 is an enlarged vertical section taken along line 5—5 of Fig. 2;

Fig. 6 is an enlarged vertical section taken along line 6—6 of Fig. 3;

Fig. 7 is an enlarged vertical section taken along line 7—7 of Fig. 3;

Fig. 8 is an enlarged section taken along line 8—8 of Fig. 2, and

Fig. 9 is a fragmentary side elevation of an apparatus forming another embodiment of the invention.

Referring now in detail to the drawings, there is shown therein a continuous extruding and vulcanizing machine for forming and vulcanizing a protective covering 10 (Fig. 3) over a filamentary core 11 (Fig. 1) to form a filamentary article 12. In forming the covering upon the core 11, the core is advanced continuously from a supply reel 14 at a high rate of speed by a supply capstan 15, which is disclosed and claimed in copending application Serial No. 697,809, filed September 8, 1946, by D. D. Jones for "Apparatus for Covering Cores," now issued as Patent No. 2,513,802, dated July 4, 1950. The core 11 is advanced continuously by a takeup capstan 20 from the supply capstan 15 around sheaves 17 (Fig. 2), 18 (Fig. 1) and 19 to a takeup reel 21. As the core 11 is drawn from the supply capstan 15, it passes through an extruder 22, which extrudes the covering 10 composed of a vulcanizable compound thereover. The resulting filamentary article then passes into an elongated vulcanizing tube 23, which has steam under a high pressure supplied thereto by a steam pipe 25, whereby the covering of insulating compound is vulcanized as it is advanced through the vulcanizing tube. The resulting article 12 passes from the vulcanizing tube into and through a cooling and sealing unit 27 (Fig. 2) wherein the covering 10 is cooled and maintained under pressure. The article 12 is advanced from the unit 27 around the return sheave 17, into a cooling trough 28, to which cold water is supplied, and around the return sheaves 18 and 19.

The cooling and sealing unit 27 includes sections 30, 31, 32 and 33 (Fig. 2), and the sections 31 and 32 are connected by an elongated cooling tube 35. The section 30 includes a hollow casting 36 (Fig. 3) and partitions 45, 46 and 47 forming chambers 40, 41, 42 and 43. The partition 45 is provided with an enlarged opening 44 through which a threaded boss 55 of a protective cup 48 projects. A nut 49 secures the cup 48 to the partition 45. A pressure reducing bushing 50 having a threaded portion 51 is screwed into a tapped bore 52 formed in the cup 48 until a shoulder 53 formed on the bushing 50 abuts the cup 48. The bushing 50 has a central bore 54 therethrough of a predetermined diameter which is slightly larger than the diameter of the filamentary article 12.

The bushing 50 may be removed from the tapped bore 52 if desired, and another similar bushing having an internal bore of a different diameter or length may be substituted therefor. For example, if a filamentary article having a diameter smaller than that of the article 12 is to be formed by the extruding and vulcanizing machine, a bushing having an internal bore proportionately smaller than the bore 54 in the bushing 50 may be substituted for the bushing 50. Conversely, if a larger filamentary article is to be formed, a bushing having a larger bore would be used.

The partitions 46 and 47 are provided with bores 56 and 57 therethrough, and shanks 58 and 59 of bushings 60 and 61, respectively, project through the bores 56 and 57, respectively, and are secured in these positions by nuts 62 and 63, respectively. The bushings 60 and 61 are provided with bores 64 and 65, respectively, through which the covered conductor may be advanced and which serve to retard movement of water with the covered conductor. The diameter of the bores 64 and 65 are equal and are equal to that of the bore 54 in the bushing 50. Other bushings similar to the bushings 60 and 61 but having bores of a different diameter than that of the bores 64 and 65, may be substituted for the bushings 60 and 61 when such substitution is found to be desirable and for making filamentary articles of different diameters.

The right end of the casting 36, as viewed in Fig. 3, includes a flange 70 designed to be secured to a flange 71 on the exit end of the vulcanizing tube 23. A bushing 72 is removably mounted in bores 73 and 74 formed in end walls 75 and 76 of the sections 30 and the section 31, respectively.

A pipe 80 for supplying cold water under a pressure equal to that of steam supplied to the vulcanizing tube 23 is threaded into a tapped bore 81 formed in the casting 36 of the section 30 and a drain pipe 82 is threaded in a tapped bore 83 leading into the chamber 40 and connected to a suitable pressure maintaining device 79 such as a steam trap or a similar restriction. If it is found advantageous, the drain pipe 82 may be threaded into a tapped bore 84 leading into the chamber 41, the pipe 80 may be threaded into a tapped bore 85 leading into the chamber 42, and the bores 81 and 83 sealed by plugs 77 and 78 which are shown threaded into the tapped bores 84 and 85, respectively.

The section 30 is provided with a plurality of hand holes, of which a hand hole 90 (Fig. 7) is shown, which normally are sealed by quick-acting closure means 89—89 (Fig. 2) so that access to each of the chambers 40, 41, 42 and 43 is provided for stringing the conductor through the apparatus, for replacing the bushings 50, 60, 61 and 72 (Fig. 3) as desired, and for cleaning debris from these chambers.

The sections 31, 32 and 33 (Fig. 2) are substantially identical with the section 30 but do not include the bores 81, 83, 84, and 85. Bolts 86—86 (Fig. 3) connect the sections 30 and 31 together, and a flange 87 of the section 31 is bolted to a flange 88 of the cooling tube 35. The section 33 is provided with a large tapped bore 91 into which a drain pipe 92 is threaded. The drain pipe 92 is kept closed during the operation of the apparatus, and water normally drains through an exit bushing 93 to a drain pan 94.

To provide for expansion and contraction of the vulcanizing tube 23 as it is heated or cooled, a plurality of standards 113—113 (Figs. 1, 2 and 8) support cradles, of which a cradle 112 is shown, which slidably mount slides, of which a slide 111 is shown. Standards 116—116 (Figs. 2 and 5) support a guideway 117 supporting rollers 114—114, which support the sections 30, 31, 32 and 33. A roller 115 carried by the guideway 117 supports the cooling tube 35. Thus, all expansions and contractions of the elongated vulcanizing tube 23 from changes in temperature are taken care of without damage to the apparatus.

Operation

In the operation of the apparatus described hereinabove, the core 11 is advanced through the extruder 22, the vulcanizing tube 23 and the cooling and sealing unit 27 (Fig. 2). The steam introduced into the vulcanizing tube heats the covering 10 and vulcanizes it as it is continuously advanced therethrough. As the resulting filamentary article 12 is advanced through the unit 27, cold water under high pressure supplied to the seal by the supply pipe 80 cools the covering 10 to toughen it, and the high pressure of the water on the covering prevents damage to the covering from moisture enclosed within the covering. As the covering is cooled the moisture enclosed thereby is cooled, which reduces the pressure thereof.

The pressure on the portion of the water entering the chamber 40 (Fig. 3) in the section 30 is substantially equal to that of the steam in the vulcanizing tube so that it prevents the steam from passing through this section. Any condensed steam and a portion of the cooling water flows through the drain pipe 82 to the pressure maintaining device which prevents a drop in the pressures of the water and the steam in the chamber 40. The remainder of the cooling water flows through the sections 30 and 31, the tube 35 and the sections 32 and 33. The flow in the sections 30 and 31 is turbulent and greatly reduces the flow and the pressure of the cooling water, but the pressure is still considerably above that of the atmosphere as the water flows through the tube 35, which provides a long path for the filamentary article 12 so that the cooling effect of the water in the tube 35 is great. That is, the water flowing through the cooling tube exerts a pressure on the covering 10 sufficient to prevent rupturing or blistering thereof by pressure of moisture enclosed thereby.

The sections 32 and 33 agitate the water to further reduce the pressure thereon as it flows therethrough and through the orifice 93, at which point the water is substantially at atmospheric pressure. The water in the tube 35 is still at a pressure substantially greater than that of atmosphere so that the filamentary article is under a high exterior pressure as it is cooling to prevent the pressures of the moisture enclosed therein from rupturing or distorting the covering. By the time each increment of the article reaches the exit of the section 33, the pressure of the moisture enclosed within the covering 10 (Fig. 4) has been reduced by the cooling effect of the water and the covering has been toughened sufficiently to prevent the moisture from bursting or distorting the covering even though the pressure of the water has been reduced to a point not much greater than that of atmosphere.

Since the bushings exemplified by the bushings 60, 61, and 72 are removable, the cooling and sealing unit 27 may be quickly adapted for use in the manufacture of articles of various sizes.

*Alternative embodiment*

An apparatus forming another embodiment of the invention is shown in Fig. 9, and is designed to apply a protective covering 210 to a core 211, which is drawn through an extruder 222, a vulcanizing tube 223 and a cooling and sealing unit 227 to form a filamentary article 212. The unit 227 includes sections 230, 231, 233 and 234. The section 230 is substantially identical with the section 30 (Fig. 2) and cold water is supplied thereto by a supply pipe 280 (Fig. 9). The section 231 is substantially identical with the section 31 (Fig. 2), and the sections 233 and 234 (Fig. 9) are substantially identical with the section 33 (Fig. 2). A tapped bore 291 (Fig. 9) of the section 233 is connected to a drain pipe 290 which is open only when the apparatus is stopped, and a tapped bore 292 is connected to a drain pipe 293, which is also closed during the operation of the apparatus.

The section 233 is connected to a housing 300 provided with a removable covering 301. The sections 233 and 234 are connected to the housing 300, and the housing mounts a sheave 302 rotatably therein for guiding the article 212 from the section 233 to the section 234. The filamentary article 212 passes out of the section 234 into a cooling trough 228, from which it is drawn around sheaves 218, 219 by a capstan 220 and is wound on a takeup reel 221.

*Operation of alternative embodiment*

In the operation of the last-described embodiment of invention, the covering 210 is extruded around the conductive core 211, and the resulting filamentary article 212 is advanced through the vulcanizing tube 223 and the cooling and sealing unit 227. Steam is introduced into the vulcanizing tube and vulcanizes the covering 210, and cold water introduced into the unit 227 cools the covered conductor and toughens the covering 210. The cold water in the right hand portion, of the unit, as viewed in Fig. 9, is under a pressure equal to that of the steam in the vulcanizing tube 223 to restrain the steam. A portion of the water and the condensed steam flow through a drain pipe 282 leading to a steam trap (not shown) or similar restriction, while the rest of the cooling water flows through the sections 230 and 231 and 233, the housing 300 and the section 234 to the cooling trough 228. As the water so flows, the sections 230, 231, 233 and 234 reduce the pressure of the water to a point not much greater than that of the atmosphere into which the water flows from the free end of the section 234 through a bushing like the bushing 93 (Fig. 4).

In the last-described embodiment of the invention, the housing 300 (Fig. 9) forms a portion of the high pressure cooling path, and since the section 234 is mounted over the section 233 rather than extending from the housing 300, considerable floor space is saved.

The above-described apparatus are simple in construction and operation, and are highly efficacious in preventing rupture or distortion of the vulcanized coverings. Furthermore, they may be adapted quickly to manufacture articles of different sizes, and thus possess a high degree of flexibility. Also, access is provided through the handholes to each chamber so that debris may be easily removed therefrom.

Apparatus embodying the invention is particularly well adapted to the manufacture of insulated or jacketed conductors and cables. Such apparatus is especially useful in jacketing previously insulated conductors having coverings of a textile material thereon, for example, coverings of braided, knitted or served cotton strands. These textile coverings tend to absorb moisture and to entrap air in the interstices thereof. When the jacketed product emerges from a vulcanizing tube, the moisture tends to form steam having sufficient pressure to damage the vulcanized jacket. Also the entrapped air tends to expand and add its pressure to that of the steam. By cooling the jacket under pressure immediately after it leaves the vulcanizing tube, any steam and entrapped air beneath the jacket are prevented from bursting or distorting the jacket.

Obviously, the apparatus described herein could be utilized to make other filamentary articles made in whole or in part of vulcanized material. For example, cords, ribbons, strands, cables, or the like, either homogeneous or composite, may be made by apparatus embodying the invention.

What is claimed is:

1. A cooling and sealing unit for a continuous vulcanizing apparatus having steam therein, which comprises a plurality of chambers positioned in end to end relationship and having walls therebetween, each of said walls having a centrally located hole therein, a plurality of bushings, each of said bushings having a shoulder thereon fitting against one side of one of the walls and a threaded shank portion extending through the hole in that wall, and a plurality of nuts for threadedly engaging the shank portions of the bushings to removably secure the bushings in the holes in the walls.

2. A cooling and sealing unit for a continuous vulcanizing apparatus having steam under a high pressure therein, which comprises a pressure reducing tube connected to such a vulcanizing apparatus, means for supplying cold water under high pressure to the tube, a plurality of baffles positioned transversely in the pressure reducing tube and having apertures located centrally therein, a plurality of bushings removably mounted in the apertures for reducing the pressure of the water as it flows therethrough, an elongated unobstructed cooling tube connected in tandem with the pressure reducing tube, a second pressure reducing tube connected in tandem with the cooling tube, a plurality of baffles positioned transversely in the second pressure reducing tube and having apertures located centrally therein, a plurality of bushings removably mounted in the last-mentioned apertures for further reducing the pressure of the water, each of the bushings having a shoulder fitted against one side of one of the baffles, and means on the other side of each baffle for locking the bushings in the apertures in the baffles.

3. A cooling and sealing unit for a continuous vulcanizing apparatus having steam under a high pressure therein, which comprises an elongated tube connected to such a vulcanizing apparatus, a plurality of pressure reducing baffles positioned transversely in a portion of the tube near one end thereof and having centrally located holes therein, a plurality of pressure reducing baffles positioned transversely in a portion of the tube near the other end of the tube and having centrally located holes therein, the portion of the tube between said portions thereof being unobstructed, means for introducing a cooling medium under a high pressure into the tube, a plurality of bushings removably fitted into the holes in the baffles, means for locking the bushings to the baffles, said elongated tube having a plurality of openings to provide access to the removable bushings in the interior thereof, and a plurality of pressure tight closures removably fitted into said openings.

4. In a continuous vulcanizing apparatus, including a vulcanizing tube having steam under a predetermined pressure therein, a cooling and sealing unit which comprises a pressure tight housing having an inlet extending in a predetermined direction and an outlet extending in a direction substantially parallel to that of the inlet, a sheave mounted rotatably in the housing for guiding a filamentary article from the inlet to the outlet, a conduit positioned between the vulcanizing tube and the inlet and in communication therewith, a conduit mounted in communication with the outlet, a plurality of partitions having central apertures therein mounted in the conduits so as to compartmentize the conduits, a plurality of bushings mounted removably in the apertures in the partitions, and means for introducing a cooling and sealing fluid under pressure into the pressure tight housing and the conduits whereby all these elements are kept filled with the fluid under pressure.

5. A cooling and sealing unit for a continuous vulcanizing apparatus, which comprises a vulcanizing tube, a cooling and sealing tube positioned in tandem with the vulcanizing tube, a partition positioned transversely in the cooling and sealing tube and having an opening therein, a bushing positioned in alignment with the opening in the partition and extending a substantial distance away from the partition, means for locking the bushing to the partition removably, and a water supply pipe directed toward the bushing transversely with respect to the longitudinal axis of the bushing.

GEORGE E. BERGGREN.
LEROY W. LOVETT.

REFERENCES CITED

The following references are of record in the file of this patent:

UNITED STATES PATENTS

| Number | Name | Date |
|---|---|---|
| 1,788,527 | Kivley | Jan. 13, 1931 |
| 1,813,179 | Lodge | July 7, 1931 |
| 2,029,435 | Moody et al. | Feb. 4, 1936 |
| 2,069,087 | Forstrom et al. | Jan. 26, 1937 |
| 2,426,341 | Canfield | Aug. 26, 1947 |

FOREIGN PATENTS

| Number | Country | Date |
|---|---|---|
| 505,162 | Great Britain | May 5, 1939 |
| 843,995 | France | Apr. 11, 1939 |
| 864,121 | France | Apr. 19, 1941 |